United States Patent [19]
Jones

[11] 4,042,518
[45] Aug. 16, 1977

[54] STOICHIOMETRIC FERRITE CARRIERS

[75] Inventor: Lewis O. Jones, Webster, N.Y.

[73] Assignee: Xerox Corporation, Stamford, Conn.

[21] Appl. No.: 593,401

[22] Filed: July 7, 1975

Related U.S. Application Data

[62] Division of Ser. No. 394,604, Sept. 5, 1973, Pat. No. 3,929,657.

[51] Int. Cl.² .......................... G03G 9/00; C04B 35/30
[52] U.S. Cl. ................................ 252/62.6; 252/62.62; 252/62.64; 252/519; 252/521
[58] Field of Search ................ 252/62.64, 62.6, 62.62, 252/62.1 P, 519, 521

[56] References Cited

U.S. PATENT DOCUMENTS

| | | | |
|---|---|---|---|
| 2,685,568 | 8/1954 | Wilson | 252/62.6 |
| 2,773,039 | 12/1956 | Schoenberg | 252/62.6 X |
| 2,846,333 | 8/1958 | Wilson | 252/62.62 X |
| 3,428,416 | 2/1969 | Gie et al. | 252/62.6 X |

FOREIGN PATENT DOCUMENTS

| | | | |
|---|---|---|---|
| 1,115,915 | 6/1968 | United Kingdom | 252/62.6 |

*Primary Examiner*—Jack Cooper

[57] ABSTRACT

Humidity insensitive, uncoated electrostatographic carrier materials comprising substantially stoichiometric ferrite compositions using various divalent metal oxides and/or one monovalent metal oxide, singly and in combination, which are within about ± 3 mol percent deviation from stoichiometry in divalent metal content. The carrier materials may be mixed with toner materials to form developer mixtures and employed to develop electrostatic latent images.

1 Claim, No Drawings

STOICHIOMETRIC FERRITE CARRIERS

This application is a divisional application of Ser. No. 394,604, filed on Sept. 5, 1973, now U.S. Pat. 3,929,657.

BACKGROUND OF THE INVENTION

This invention relates in general to electrostatography and in particular to magnetically attractable ferrite carrier particles useful in the magnetic brush type development of electrostatic latent images.

Electrostatographic imaging processes and techniques have been extensively described in both the patent and other literature, for example, U.S. Pat. Nos. 2,221,776, 2,277,013, 2,297,691, 2,357,809, 2,551,582, 2,285,814, 2,833,648, 3,220,324, 3,220,831, 3,220,833, and many others. Generally, these processes have in common the steps of employing a normally insulating photoconductive element which is prepared to respond to imagewise exposure with electromagnetic radiation by forming a latent electrostatic charge image. The electrostatic latent image is then rendered visible by a development step in which the charged surface of the photoconductive element is brought into contact with a suitable developer mix.

One method for applying the developer mix is by the well-known magnetic brush process. Such a process can utilize apparatus of the type described, for example, in U.S. Pat. No. 2,874,063 and often comprises a nonmagnetic rotatably mounted cylinder having fixed magnetic means mounted inside. The cylinder is arranged to rotate so that part of the surface is immersed in or otherwise contacted with a supply of developer mix. The granular mass comprising the developer mix is magnetically attracted to the surface of the cylinder. As the developer mix comes within the influence of the field generated by the magnetic means within the cylinder, the particles thereof arrange themselves in bristle-like formations resembling a brush. The bristle formations of developer mix tend to conform to the lines of magnetic flux, standing erect in the vicinity of the poles and lying substantially flat when said mix is outside the environment of the magnetic poles. Within one revolution the continually rotating tube picks up developer mix from a supply source and returns part or all of this material to the supply. This mode of operation assures that fresh mix is always available to the copy sheet surface at its point of contact with the brush. In a typical rotational cycle, the roller performs the successive steps of developer-mix pickup, brush formation, brush contact with the photoconductive element, brush collapse and finally mix release.

In magnetic-brush development of electrostatic images, the developer is commonly a triboelectric mixture of fine toner powder comprised of dyed or pigmented thermoplastic resin with coarser carrier particles of a soft magnetic material such as "ground chemical iron" (iron filings), reduced oxide particles, or the like. The conductivity of the ferromagnetic carrier particles which form the "bristles" of a magnetic brush gives some advantage over other modes of development. The conductivity of the ferromagnetic fibers or bristles provides the effect of a development electrode having a very close spacing to the surface of the electrophotographic element being developed. By virtue of this development electrode effect, it is to some extent possible to develop part of the tones in pictures and solid blacks as well as line copy. This ability to obtain solid area development with magnetic brush developing makes this mode of developing advantageous where it is desired to copy materials other than simple line copy.

However, most currently available ferromagnetic carrier particles have an electrical resistance which is too high to produce good quality solid area development. The various commercial carrier particles generally lack adequate conductivity because of the presence of an insulating surface layer of iron oxide, grease or other contaminants. Efforts to remove such surface contaminants often result in particles which have an even higher electrical resistivity. For example, washing or solvent treatment of iron carrier particles in an effort to remove contaminants merely exposes the surface of the underlying iron to aerial oxidation. The new layer of oxide often has far greater resistivity than the original contaminants. Such an oxide coating can be removed; however, special after-treatment and precaution in storage and handling are required in order to avoid any further oxidation.

Ferrite materials are gaining ever increasing importance in the electronics industry and in the electrostatographic arts. Their use as low conductivity magnetic core materials and as carrier materials for photoconductive insulating materials is well known. Briefly, ferrites may be described in general as compounds of magnetic oxides containing iron as a major metallic component. Thus, compounds of ferric oxide, $Fe_2O_3$, formed with basic metallic oxides having the general formula $MFeO_2$ or $MFe_2O_4$ where M represents a mono or divalent metal and the iron is in the oxidation state of +3 are ferrites. Ferrites are also refered to as ferrospinels since they have the same crystal structure of the mineral spinel $MgAl_2O_4$. However, not all ferites are magnetic such as, for example, $ZnFe_2O_4$ and $CdFe_2O_4$. This lack of magnetic property is due to the configuration of the ferrite lattice structure. Further, some ferrites, such as magnetobarite, $BaFe_{12}O_{19}$, which exhibit permanent magnetic properties are referred to as hard ferrites. A "hard" ferrite is difficult to magnetize and demagnetize and thus is the type of ferrite that is desirable in a permanent magnet. A "soft" ferrite has the opposite property; it is easily magnetized and demagnetized. The softer the ferrite material is, the better it is suited to various electrical devices in which magnetization must be reversed very often per unit of time. If one plots the characteristics of a hard ferrite and a soft ferrite on a graph in which the imposed magnetic field forms the horizontal axis and the total magnetization forms the vertical axis, one obtains a characteristic curve resembling a thick S known as a hysteresis loop. A hard ferrite has a wide hysteresis loop and a soft ferrite has a narrow one. Since each traversal of a loop represents energy lost, a narrow loop is desirable in devices in which magnetization must be reversed frequently.

The ferrite materials of main interest in the electrostatographic arts are the soft ferrites. The soft ferrites may further be characterized as being magnetic, polycrystalline, highly resistive ceramic materials exemplified by intimate mixtures of nickel, manganese, magnesium, zinc, iron, or other suitable metal oxides with iron oxide. Upon firing or sintering, the oxide mixtures assume a particular lattice structure which governs the magnetic and electrical properties of the resulting ferrite.

Electrostatograhic carrier surfaces and carrier particles are generally made from or coated with materials having appropriate triboelectric properties as well as certain other physical characteristics. However, the carrier substrate as well as the surface thereof should not be comprised of materials which are so brittle as to cause either flaking of the surface of particle breakup under the forces exerted on the carrier during recycle. The flaking thereof causes undesirable effects in that the relatively small flaked particles will eventually be transferred to the copy surface thereby interfering with the deposited toner and causing imperfections in the copy image. Furthermore, flaking of the carrier surface will cause the resultant carrier to have nonuniform triboelectric properties when the carrier is composed of a material different from the surface coating thereon. This results in undersirable nonuniform pickup of toner by the carrier and nonuniform deposition of toner on the image. In addition, when the carrier particle size is reduced, the removal of the resultant small particles from the photoconductive plate becomes increasingly difficult. Thus, the types of materials useful for making carrier or for coating carrier, although having the appropriate triboelectric properties, are limited because other physical properties which they possess may cause the undesirable results discussed above.

While ordinarily capable of producing good quality images, conventional developing materials suffer further serious deficiencies in certain areas. The developing materials must flow freely to facilitate accurate metering and even distribution during the development and developer recycling phases of the electrostatographic process. Some developer materials, though possessing desirable properties, such as proper triboelectric characteristics, are unsuitable because they tend to cake, bridge, and agglomerate during handling and storage. Adherence of carrier particles to reusable electrostatographic imaging surfaces causes the formation of undesirable scratches on the surfaces during the image transfer and surface cleaning steps. The tendency of carrier particles to adhere to imaging surfaces is aggravated when the carrier surfaces are rough and irregular. The coatings of most carrier particles deteriorate rapidly when employed in continuous processes which require the recycling of carrier particles by bucket conveyors partially submerged in the developer supply such as disclosed in U.S. Pat. No. 3,099,943. Deterioration occurs when portions of the entire coating separate from the carrier core. The separation may be in the form of chips, flakes, or entire layers and is primarily caused by fragile, poorly adhering coating materials which fail upon impact and abrasive contact with machine parts and other carrier particles. Carriers having coatings which tend to chip and otherwise separate from the carrier core or substrate must be frequently replaced thereby increasing expense and loss of productive time. Print deletion and poor print quality occur when carriers having damaged coatings are not replaced. Fines and grit formed from carrier disintegration tend to drift and form undesirable and damaging deposits on critical machine parts. Many carrier coatings having high compressive and tensile strength either do not adhere well to the carrier core or do not possess the desired triboelectric characteristics. The triboelectric and flow characteristics of many carriers are adversely affected when relative humidity is high. For example, the triboelectric values of some carriers fluctuate with changes in relative humidity and are not desirable for employment in electrostatographic systems, particularly in automatic machines which require carriers having stable and predictable triboelectric values.

Thus, there is a continuing need for a better developer material for developing electrostatic latent images.

SUMMARY OF THE INVENTION

It is, therefore, an object of this invention to provide developer materials which overcome the above noted deficiencies.

It is another object of this invention to provide developer materials which flow freely.

It is yet another object of this invention to provide developer materials having more stable electrostatographic properties.

It is yet another object of this invention to provide developer materials having more uniform electrostatographic characteristics.

It is still another object of this invention to provide uncoated electrostatographic carriers which are less humidity sensitive than known carriers.

It is another object of this invention to provide substantially stoichiometric ferrite carrier particles having improved electrostatograhic properties.

It is another object of this invention to provide improved semi-conductive, magnetically attractable ferrite carrier particles having good magnetic response and good stability properties under ordinary conditions of storage and use.

A still further object of this invention is to provide improved developer materials having physical and chemical properties superior to those of known developer materials.

The above objects and other are accomplished, generally speaking, by providing electrostatographic carrier materials comprising substantially stoichiometric ferrite compositions. As used in the present specification, "substantially stoichiometric" is understood to include ferrite formulations using various divalent metal oxides and/or more monovalent metal oxide, singly and in combination, which are within about $\pm$ 3 mol percent deviation from stoichiometry in divalent metal content. Thus, satisfactory results are obtained when the ferrite compositions of this invention comprise about $\pm$ 3 mol percent deviation from stoichiometry. However, it is peferred that the ferrite compositions of this invention comprise from about $+1$ to about $+3$ mol percent deviation from stoichiometry because in the use of these materials in electrostatographic development processes employing magnetic carrier particles to transport toner materials, they provide proper triboelectric charging of the toner materials, magnetic and electrical properties, relative humidity insensitivity at high humidity conditions, such as 80 percent relative humidity, and low image background levels. Optimum results are obtained when the ferrite compositions of this invention comprise from about 0 to about $+1$ mol percent deviation from stoichiometry.

Any suitable mixture of metal oxides may be employed to provide the substantially stoichiometric, magnetic, semiconducting, uncoated ferrite carrier compositions of this invention. Typical mixtures of metal oxides include the following formulations presented on a molar basis:

$NiO_{0.3}ZnO_{0.7} \cdot (Fe_2O_3)_{0.99}$ $NiO_{0.39}ZnO_{0.68}MnO_{0.03} \cdot (Fe_2O_3)_{1.0}$ $NiO_{0.3}ZnO_{0.7} \cdot (Fe_2O_3)_{0.99} + CaO_3$ (1.5% mol)

$(Li_{0.5}Fe_{0.5})O \cdot Fe_2O_4$ $(Li_{0.5}Fe_{0.5})_{0.3}ZnO_{0.7} \cdot Fe_2O_3$ $MnO \cdot Fe_2O_3 + CaO$ (1.5% mol)

$NiO_{0.38}ZnO_{0.57}MnO_{0.03}CuO_{0.07} \cdot (Fe_2O_3)_{1.0}$ $NiO_{0.18}ZnO_{0.45}MgO_{0.03}MnO_{0.05}CuO_{0.06} \cdot (Fe_2O_3)_{1.0}$ $NiO_{0.32}ZnO_{0.56}CuO_{0.09} \cdot (Fe_2O_3)_{1.02}$ $MgO_{0.5}ZnO_{0.3}MnO_{0.05}CUO_{0.1} \cdot (Fe_2O_3)_{1.0}$ It is to be understood that numerous modifications of the above formulations may be obtained as is apparent. In any event, the formulations of the starting oxide mixtures should be selected so that after sintering the oxides, the resulting ferrite composition will be substantially stoichiometric as described above. The desired metal oxide materials may be selected on the basis of desired processed ferrite properties and/or economics.

Any suitable method may be employed to prepare the ferrite materials of this invention. Typically, a slurry of the ferrite forming metal oxides is prepared in a liquid, the slurry of mixed metal oxides is dried under conditions to form substantially spherical beads, and the beads are fired or sintered under conditions which preserve the shape and particulate nature of the ferrite beads. In a preferred embodiment using a high speed mixer, the metal oxide starting materials are slowly added to a make-up tank while a deflocculent is added so that the solids are continually wetted out. A smooth, homogenous slurry is generally formed after approximately 10 minutes of agitation depending upon the equipment capacity and the size of the batch prepared. If the finished ferrite is to be composed of several components for use as a carrier particle, it is usually desirable to achieve an intimate mixture of the metal oxide starting materials by this slurry preparation process. The actual degree of mixing achieved may be controlled by the choice of equipment used and selection of specific equipment operating parameters and/or slurry conditions such as mixing speed, mixing time, viscosity, and temperature. Where it is desired to obtain controlled particle size reduction during the mixing operation, then the choice of equipment will generally predominate. The metal oxide starting materials may be mixed in slurry form in any one of the following types of equipment such as ball-milling, vibrating pebble mill, high speed stirrer with counter turning rotor and blades, impeller mixer, high speed dispersator, and other conventional mixing equipment. As an alternative, one may dry mix the metal oxide starting material and combine the dry mixture at a later time with a liquid medium. Following the slurrying operation, it is generally preferred to screen the slurries prior to drying in order to eliminate any large solid particles which may be present as would plug an atomizer in spray-drying.

A spray-dryer designed for either spray nozzle atomization or spray machine-disc atomization or equivalent may be employed to dry the slurry of metal oxide starting materials. A particularly desirable type of spray machine is one that is essentially a closed pump impeller driven by a variable speed drive and is commonly termed a spinning atomizer, disc, or wheel. The total system generally consists of a power-coolant-lubrication console, power cables, fluid transport hoses, and a variable speedmotor drive with closed impeller. The high speed impeller uses the energy of centrifugal force to atomize the slurry. The particle size distribution obtained with this spray machine is generally narrow. In addition, product characteristics may be varied by the spinning atomizer design, speed, and position in the chamber relative to air entrance. Preferably, when employing the spinning atomizer, the spray-dryer should have a large diameter configuration to avoid sticking of the atomized metal oxide particles to the dryer chamber walls. Slurries of metal oxides may be atomized using two-fluid nozzles where the atomizing force is pressurized air, single-fluid pressure nozzles where the atomizing force is the pressure of the slurry itself released through an orifice, and centrifugal atomization by a spinning wheel or other suitable atomization method. The atomizing pressures, or the speed of rotation in the case of wheel atomization, and the slurry feed rates may be varied as a partial control of particle size. It is also possible to control the particle size of spray-dried metal oxide beads by varying the percentage of solids in the feed slurry. The atomizing force and feed rate should be adjusted to the configuration, size, and volumetric air flow of a given drying chamber in order that atomized particles do not contact drying chamber surfaces while still wet. In accordance with this invention, the percentage of solids in the feed slurry may be varied from about 15.0 to about 80.0 percent by weight of oxides slurried in the liquid medium. If a deflocculent material is added to the metal oxide slurry, the concentration of deflocculent may be varied from about 0.01 to about 2.0 percent by weight of the oxide solids. Although considerable latitude exists in regard to the metal oxide particle sizes employed for the slurry, metal oxide particles having an average particle size less than about 25 microns are preferred to avoid high settling rates in the slurry.

The dried metal oxide beads may be collected in drying chambers of suitable size. Spray-dried metal oxide beads have been collected in a chamber 30 inches in diameter and 6 feet in height, with volumetric air flow of 250 cfm. With a system of this type, a product collection rate of about 30 pounds per hour may be maintained. The same oxide slurry may be dried in a chamber 12 feet in diameter and 20 feet in height, with volumetric air flow of about 12,000 cfm. When employing this latter system, a product collection rate of about 400 pounds per hour of spray-dried metal oxide material may be maintained. It has been found that both types of dryer systems will produce a spray-dried metal oxide product in the size range for electrostatographic use, for example, on the order of 50 to 500 microns. In addition, both co-current and counter-current drying systems yield satisfactory products. The temperature of the drying air may be varied from about 400° F to about 900° F at the inlet and from about 200° F to about 700° F at the outlet with satisfactory results.

When sintered ferrite materials are to be employed in the electrostatographic art, it is desirable that the ferrite material when employed as a carrier possess certain basic properties. The ferrite carrier should have uniform electrostatographic properties such as triboelectricity, magnetic permeability, and electrical conductivity, as to meet machine performance requirements. The ferrite carrier should be substantially uniform in size and sufficiently dense individual beads in order to minimize possible bead sticking to the photoreceptor. The ferrite carrier also should have uniform surface characteristics with a minimum of surface contamination.

Any suitable type of sintering furnace may be employed in the preparation of the ferrite materials of this invention. Typical sintering furnaces include a static furnace, a rotary kiln, a tunnel kiln, or an agitated bed furnace. The static furnace type will generally provide for long residence times. The rotary kiln type of sintering furnace generally provides uniform product reaction, consistent residence time and high capacity throughput. When employing a rotary kiln sintering furnace, a special media, such as a flow promoting ingredient, for example, aluminum oxide, zirconium oxide, or other materials may be added in combination with the metal oxide beads to minimize or avoid bead-to-bead agglomeration and bead to furnace wall sticking. Preferably, the flow promoting ingredient is approximately the same size as the dried metal oxide beads because bead-to-bead agglomeration and bead to furnace wall sticking is substantially eliminated. Thus, if the dried beads are about 100 microns, the flow promoting ingredient should be about 100 microns. In addition, to further avoid or minimize metal oxide bead sticking to rotary furnace walls, a scraping device may be employed individually or in combination with the flow promoting ingredient. However, a tunnel kiln furnace with atmosphere control is preferred in the preparation of the ferrite materials of this invention. Although the electrical properties of the ferrite materials may be controlled by the sintering temperature followed by a quench when employing a static, rotary, or an agitated bed sintering furnace, it has been found that by controlling the sintering temperature and controlling the oxygen content of the cooling atmosphere when employing a static or tunnel kiln sintering furnace that ferrite materials possessing maximum electrostatographic properties are obtained. That is, a tunnel kiln furnace enabling a controlled sintering temperature and controlled atmosphere profile provides a more controlled, high production rate method of preparing the ferrite materials. In any event, the sintering of metal oxide beads should be under controlled conditions as to preserve the shape and particulate nature of the beads while providing a uniform furnace residence time to produce maximum bead uniformity and desired properties.

Firing of the dried metal oxide beads at elevated temperatures to induce reaction of the ferrite components is generally carried out between 1150° and 1600° C. Actually, lower and higher temperatures may be used, but this is dictated by the processing time, the furnace materials of construction generally available, the ferrite formulation, and the resulting strength of the fired bead. Generally, if a nickel-zinc ferrite carrier material is fired at 1100° C for less than one hour, the carrier material may lack mechanical strength and sufficient magnetic permeability. On the other hand, firing at about 1600° C will generally place undue demands upon production equipment. If a low firing temperature is chosen, for example, about 900° C, a longer firing time is generally required to achieve sufficient solid state reaction than if one chooses to fire at a higher temperature, for example, about 1400° or 1500° C. This is particularly important with respect to the resulting mechanical strength of the carrier material. To achieve the desired electrostatographic characteristics based on firing, the firing time and temperature relationship is important to establish the minimum firing conditions relative to the bead strength. Optimum electrostatographic ferrite carrier properties are obtained at sintering temperatures ranging from 1300° to about 1400° C with a residence time of about 10 to about 60 minutes. The preferred range of sintering temperatures is from about 1150° to about 1500° C with a residence time of about 10 to about 180 minutes because the ferrite materials are magnetic, have a polycrystalline spinel structure, are highly resistive, and provide the maximum electrostatographic response. Satisfactory electrostatographic ferrite carrier properties are also obtained at sintering temperatures ranging from about 900° to about 1600° C with a residence time of about 5 hours. Thus, the residence time at a particular firing temperature is usually dependent upon the material mass when employing a static furnace, and the mass flow rate when employing a rotary or tunnel kiln furnace. In any event, the sintering conditions should be sufficient to provide the desired polycrystalline spinel ferrite structure possessing the maximum electrostatographic characteristics.

The firing atmosphere used is also important in that it influences oxygen content and thus the oxidation state of the metal ions present in the forming crystal structure. Here, also, the conductivity of the ferrite carrier is influenced by an oxygen rich or deficient atmosphere. An example of the influence of the firing atmosphere is clearly demonstrated in the preparation of a ferrous-ferric ferrite from ferric oxide. When this material is fired in an oxidizing atmosphere, inferior magnetic properties are obtained whereas firing in a suitable reducing atmosphere provides acceptable magnetic properties.

Any suitable size of sintering furnace may be employed in the sintering step. Rotary furnaces may be used because they generally provide a consistent residence time, unformity of product reaction, and high capacity throughput. For example, 100 gram samples of spray-dried metal oxide beads may be successfully processed through a laboratory sized 3-inch laboratory tube rotary furnace. Several pound samples may be presintered at lower temperatures and successfully sintered in a pilot plant sized 5-inch diameter tube rotary furnace. Tonnage lots may be processed in a 12-inch diameter, gas fired, rotary furnace at rates of about 25 pounds per hour of product and at higher throughput rates. However, tunnel kiln firing is preferred and, where possible, without the use of flow promoting ingredients, such as aluminum oxide, since the presence of such ingredients has been found to promote the loss of zinc from the ferrite composition and requires initial formulation adjustments to obtain a substantially stoichiometric fired ferrite material. This type of sintering furnace provides static temperature and atmosphere profiles through which a continuous series of containers of ferrite powder can be passed. Production rates of 500 to 750 pounds per hour are common for these ferrite materials with excellent control of the desired properties. If presintering is desirable, the preferred conditions consist of presintering the dried metal oxide beads in a rotary furnace at about 900° to about 1300° C with about a 10 to 15 minute residence time because these conditions provide bead strenghtening and densification which assists in preservation of bead shape and integrity during the final sintering step. This sintering procedure provides sufficient reaction time to insure desired electrostatographic and magnetic properties of the ferrite carrier material. Following sintering, rotary cooling with about a 5 to 10 minute residence time generally provides continuous agitation of the ferrite bed during its transition from the firing temperature to that of the final cooling. This method of cooling minimizes bead agglomeration and further allows uniform discharge of a free flowing powder. Desired electrostatographic properties of ferrite carrier materials are also influenced by the cooling rate after firing. Magnetic permeability, electrical conductivity, and triboelectricity may be varied by varying the cooling rate. For example, the electrical resistivity may be decreased by two to three orders of magnitude by rapid cooling such as a short period of two to three minutes.

In the preparation of the ferrite materials of this invention, is has been found beneficial to employ a deflocculent with the metal oxide slurry. Any suitable deflocculent may be employed. Typical deflocculents include the ammonium or sodium salt or polymethacrylic acid, pyrogallic acid, tannic acid, and humic acid; and the ammonium or sodium salts of tripolyphosphate and hexamethaphosphate. A deflocculent, such as Darvan 7, which is the sodium salt of polymethacrylic acid and is available from the R. T. Vanderbilt Company, generally promotes the preparation of a concentrated metal oxide slurry having a solids content of up to about 80 percent by weight in water based on the total weight of the slurry. Further, in spite of this remarkably high solids content, the metal oxide feed slurry may be pumped to a spray-dried and atomized without clogging in a pressure nozzle or wheel atomizer. In addition, where about 50 to about 500 micron diameter beads are desirable, the high solids content of the metal oxide slurry contributes to attainment of such particle sizes. Further, the high concentration of oxides reduces the equipment and energy requirements necessary to form the particles.

Any suitable pigmented or dyed electroscopic toner material may be employed with the ferrite carrier materials of this invention. Typical toner materials include: gum copal, gum sandarac, rosin, cumaroneindene resin, asphaltum, gilsonite, phenolformaldehyde resins, rosin-modified phenolformaldehyde resins, methacrylic resins, polystyrene resins, polypropylene resins, epoxy resins, polyethylene resins, and mixtures thereof. The particular toner material to be employed obviously depends upon the separation of the toner particles from the ferrite carrier materials in the triboelectric series. As is well known in the art, sufficient separation should exist to permit the toner to electrostatically cling to the surface of the carrier. Among the patents describing electroscopic toner compositions are U.S. Pat. Nos. 2,659,670 to Copley, U.S. Pat. No. 2,753,308 to Landrigan, U.S. Pat. No. 3,079,342 to Insalaco, U.S. Pat. No. Re. 25,136 to Carlson, and U.S. Pat. No. 2,788,288 to Rheinfrank et al. These toner materials generally have an average particle diameter between about 1 and about 30 microns. Generally speaking, satisfactory results are obtained when about 1 part toner is used with about 10 to about 200 parts by weight of carrier.

Nickel-zinc ferrite and manganese-zinc ferrite electrostatographic carrier materials having compositions in accordance with this invention are preferred because they have triboelectric properties which vary from 8 to 40 microcoulombs per gram of toner depending on the specific toner used. Generally, the triboelectric value of the ferrite carriers decreases as the amount of iron oxide present is increased. Increasing the iron content beyond the stoichiometric amount of about two moles per mole of divalent metal and firing at temperatures above 1200° C induces the formation of divalent iron. The presence of divalent and trivalent iron causes an increase in the electrical conductivity of the ferrite materials. Thus, the extent of divalent iron formed and the conductivity of the ferrite and resulting developed electrostatic latent image background desired may be controlled within broad limits. Therefore, a ferrite carrier material having high electrical conductivity generally provides a developed electrostatic latent image with low background.

Generally, the ability to magnetically hold a ferrite carrier material of the nickel-zinc ferrite type in a magnetic brush configuration diminishes as the nickel to zinc ratio is decreased in the composition. In a substantially stoichiometric nickel-zinc ferrite composition the Curie Temperature generally decreases as the nickel/zinc ratio decreases. For a nickel/zinc ratio of 0.43, the Curie Temperature is approximately 50° C. Thus, nickel/zinc ratios lower than about 0.43 usually bring the Curie Temperature too close to normal ambient. Since maximum magnetic moment occurs at a nickel/zinc ratio of approximately 1.22, there is a range of ratios useful from about 0.43 to a pure nickel ferrite which is increasingly less economical. In addition, ferrite materials represented by $MO_aM'O_{1-a}(Fe_2O_3)_x$, where M and M' always total 1.0 mole of metal oxide and $x$ comprises about 0.88 to about 1.13 moles of iron, provide satisfactory electrostatographic properties when employed as carriers for electrostatographic developer mixtures.

The substantially stoichiometric ferrite compositions of the instant invention may be employed to develop electrostatic latent images on any suitable electrostatic latent image-bearing surface including conventional photoconductive surfaces. Well-known photoconductive materials include vitreous selenium, organic or inorganic photoconductors embedded in a non-photoconductive matrix, organic or inorganic photoconductors embedded in a photoconductive matrix, or the like. Representative patents in which photoconductive materials are disclosed include U.S. Pat. No. 2,803,542 to Ullrich, U.S. Pat No. 2,970,906 to Bixby, U.S. Pat. No. 3,121,006 to Middleton, U.S. Pat. No. 3,121,007 to Middleton, and U.S. Pat. No. 3,151,982 to Corrsin.

DESCRIPTION OF PREFERRED EMBODIMENTS

The following examples further define, describe, and compare methods of preparing the ferrite materials of the present invention and of utilizing them to develop electrostatic latent images. Parts and percentages are by weight unless otherwise indicated. The examples, other than the control examples, are intended to illustrate the various preferred embodiments of the present invention.

In the following examples, the unit employed for spray-drying is Bowen Tower Laboratory spray-dryer manufactured by Bowen Engineering Incorporated, North Branch, N.J. This unit has a bottom chamber collector and a single cyclone collector. This chamber collector is 30 inches in diameter and the vertical chamber height is 6 feet. Nozzle atomization is upward with a maximum vertical particle path height of about 8 feet. The incoming air is heated by direct gas firing.

EXAMPLE I

A powered metal oxide and water feed slurry comprising about 3000 grams of about 63.3 percent ferric iron oxide having a particle size of about 0.5 microns, about 25.9 percent zinc oxide having a particle size of about 0.1 microns, and about 10.8 percent nickel oxide having a particle size of about 13 micron, and about 1195 grams of water is prepared using a high speed dispersator. About 98 grams of about a 25 percent by weight solution of Darvan 7, the sodium salt of a polymethacrylic acid available from the R. T. Vanderbilt Company is added to the oxide slurry mixture as a deflocculent. The slurry mixture is about 70 percent by weight of solids. The slurry is screened using 20 mesh sieves. This slurry is fed to the spray-dryer at a feed rate of between about 260 and about 325 grams per minute, a drying air input temperature of about 490° F, and an outlet temperature of about 330° F. The type of atomizer is a two-fluid nozzle and the atomizing force is about 14 psig of air pressure. Spherical spray-dried metal oxide beads of about 100 microns average particle size are obtained. The beads collected in the dryer chamber are a dry, free-flowing powder having the molar composition:

$$NiO_{0.3}ZnO_{0.7}.(Fe_2O_3)_{0.85}$$

By calculation, it is determined that this composition provides about 8.1 percent mol deviation from stoichiometry in divalent metal content.

The dried metal oxide beads are placed in a direct electric-powered static kiln having a 2 cubic feet volume. Approximately 20–25 pounds of beads are sintered at a temperature of about 1190° C in air for about 2 hours and cooled in an atmosphere containing about 8.0 percent by weight of oxygen.

EXAMPLE II

A powdered metal oxide and water feed slurry comprising about 3000 grams of about 63.7 percent ferric iron oxide having a particle size of about 0.5 microns, about 3.1 percent cuprous carbonate having a particle size of about 10 microns, about 0.85 percent of manganese oxide having a particle size of about 10 microns, about 19.5 percent of zinc oxide having a particle size of about 0.1 microns, about 12.9 percent of nickel oxide having a particle size of about 13 microns, and about 1900 grams of water is prepared using a high speed dispersator. About 96 grams of about a 25 percent by weight solution of Darvan 7, the sodium salt of a polymethacrylic acid available from the R. T. Vanderbilt Company is added to the oxide slurry mixture. The slurry mixture is about 60 percent by weight of solids. By calculation, it is determined that this composition provides about +2.4 percent mol deviation from stoichiometry in divalent metal content. The slurry mixture is screened using 20 mesh sieves. This slurry is fed to the spray-dryer at a feed rate of between about 260 and about 325 grams per minute, a drying air input temperature of about 490° F and an outlet temperature of about 350° F. The type of atomizer is a two-fluid nozzle and the atomizing force is about 12 psig of air pressure. Spherical spray-dried metal oxide beads of about 100 microns average particle size are obtained. The beads collected in the dryer chamber are a dry, free-flowing powder having the molar composition:

$$NiO_{0.33}ZnO_{0.57}MnO_{0.03}CuO_{0.07}(Fe_2O_3)_{1.0}$$

The dried metal oxide beads are placed in a direct electric-powered static kiln having a 2 cubic feed volume. About 20 to 25 pounds of beads are sintered at a temperature of about 1190° C in air for about 2 hours and cooled in an atmosphere containing about 8.0 percent by weight of oxygen.

EXAMPLE III

A powdered metal oxide and water feed slurry comprising about 3000 grams of about 67.8 percent ferric iron oxide having a particle size of about 0.5 microns, about 2.8 percent copper carbonate having a particle size of about 10 microns, about 1.7 percent of manganese oxide having a particle size of about 10 microns, about 5.3 percent of magnesium oxide having a particle size of about 10 microns, about 16.2 percent of zinc oxide having a particle size of about 0.1 microns, about 6.3 percent of nickel oxide having a particle size of about 13 microns, and about 1070 grams of water is prepared using a high speed dispersator. About 98 grams of a 25 percent by weight solution of Darvan 7, the sodium salt of a polymethacrylic acid available from the R. T. Vanderbilt Company is added to the oxide slurry mixture, the slurry mixture is about 72 percent by weight of solids. By calculation, it is determined that this composition provides about +1.8 percent mol deviation from stoichiometry in divalent metal content. The slurry mixture is screened using 20 mesh sieves. This slurry is fed to the spray-dryer at a feed rate of between about 260 and about 325 grams per minute, a drying air input temperature of about 500° F, and an outlet temperature of about 365° F. The type of atomizer is a two-fluid nozzle and the atomizing force is about 12 psig of air pressure. Spherical spray-dried metal oxide beads of about 100 microns average particle size are obtained. The beads collected in the dryer chamber are a dry, free-flowing powder having the molar composition:

$$NiO_{0.176}ZnO_{0.45}MgO_{0.3}MnO_{0.05}CuO_{0.06}(Fe_2O_3)_{1.0}$$

The dried metal oxide beads are placed in a direct electric-powered static kiln having a 2 cubic feed volume. About 20 to 25 pounds of beads are sintered at a temperature of about 1190° C in air for about 2 hours and cooled in an atmosphere containing about 8.0 percent by weight of oxygen.

EXAMPLE IV

A developer mixture is prepared by mixing about two parts of toner consisting of styrene-n-butyl-methacrylate copolymer, polyvinyl butyral, and carbon black, produced by the method disclosed in Example I of U.S. Pat. No. 3,079,342, having an average particle size of about 10 to about 20 microns with about 100 parts of the sintered ferrite material of Example I. The developer mixture is used to develop a selenium photoconductor carrying an electrostatic latent image by the "magnetic brush" development method described in U.S. Pat. No. 2,874,063. The magnetic field of the magnet causes alignment of the carrier and toner into a brush-like configuration. The magnetic brush is brought into developing configuration with the electrostatic image-bearing surface and toner particles are drawn from the carrier particles to the latent image by electrostatic attraction. The resultant images are of good quality with background development levels of about 0.007 as measured by a standard reference scale. The atmospheric conditions during development of the images were about 40 percent relative humidity and a temperature of about 70° F. However, when the atmospheric conditions during development of the images are about 80 percent relative humidity and a temperature of about 78° F, the image background level becomes a value of 0.014 which is considerably above the value of 0.010 or lower deemed acceptable.

EXAMPLE V

A developer mixture is prepared by mixing about two parts of toner consisting of a styrene-n-butyl-methacrylate copolymer, polyvinyl butyral, and carbon black, produced by the method disclosed in Example I of U.S. Pat. No. 3,079,342, having an average particle size of about 10 to about 20 microns with about 100 parts of the sintered ferrite material of Example II. The developer mixture is used to develop a selenium photoconductor carrying an electrostatic latent image by the "magnetic brush" development method described in U.S. Pat. No. 2,874,063. The magnetic field of the magnet causes alignment of the carrier and toner into a brush-like configuration. The magnetic brush is brought into developing configuration with the electrostatic image-bearing surface and toner particles are drawn from the carrier particles to the latent image by electrostatic attraction. The resultant images are of excellent quality with background development levels of about 0.005 at about 40 percent R.H. and a temperature of about 70° F. At atmospheric conditions of about 80 percent R.H. and a temperature of about 78° F, the image background level is found to be about 0.006 and still well within the maximum value of 0.010 deemed acceptable.

EXAMPLE VI

A developer mixture is prepared by mixing about two parts of toner consisting of a styrene-n-butyl methacrylate copolymer, polyvinyl butyral, and carbon black, produced by the method disclosed in Example I of U.S. Pat. No. 3,079,342, having an average particle size of about 10 to about 20 microns with about 100 parts of the sintered ferrite material of Example III. The developer mixture is used to develop a selenium photoconductor carrying an electrostatic latent image by the magnetic brush development method described in U.S. Pat. No. 2,874,063. The magnetic field of the magnet causes alignment of the carrier and toner into a brush-like configuration. The magnetic brush is brought into developing configuration with the electrostatic image-bearing surface and toner particles are drawn from the carrier particles to the latent image by electrostatic attraction. The resultant images are of excellent quality with background development levels of about 0.002 at about 40 percent R.H. and a temperature of about 70° F. At atmospheric conditions of about 80 percent R.H. and a temperature of about 78° F, the image background level is found to be about 0.002 and still well within the maximum value of 0.010 deemed acceptable.

Although specific materials and conditions are set forth in the above examples of making the ferrite materials of this invention, these are merely intended as illustrations of the present invention. These and other ferrite materials, solvents, substituents, and processes, such as those listed above, may be substituted for those in the Examples with similar results.

Other modifications of the present invention will occur to those skilled in the art upon a reading of the present disclosure. These are intended to be included within the scope of this invention.

What is claimed is:

1. Humidity-insensitive magnetically attractable, semi-conductive, uncoated electrostatographic ferrite carrier material useful for development of electrostatic latent images, said carrier material having an average particle diameter of between about 50 microns and about 500 microns and consisting essentially of a sintered mixture of metal oxides of the formulation $NiO_{0.176}ZnO_{0.45}MgO_{0.3}MnO_{0.05}CuO_{0.06}(Fe_2O_3)_{1.0}$.

* * * * *